United States Patent [19]

Hlavacek

[11] 4,148,778

[45] Apr. 10, 1979

[54] SYNTHETIC ADHESIVE

[75] Inventor: Ivo Hlavacek, Brno, Czechoslovakia

[73] Assignee: Elitex, Koncern textilniho strojirenstvi, Liberec, Czechoslovakia

[21] Appl. No.: 853,547

[22] Filed: Nov. 21, 1977

Related U.S. Application Data

[63] Continuation of Ser. No. 742,010, Nov. 15, 1976, abandoned.

[51] Int. Cl.$^2$ .............................................. C08L 63/02
[52] U.S. Cl. .............................. 260/37 EP; 106/14.39; 106/14.44; 428/416; 526/4
[58] Field of Search ............ 260/37 EP, 45.7 R; 106/14; 428/416; 526/4

[56] References Cited

U.S. PATENT DOCUMENTS

| | | | |
|---|---|---|---|
| 2,069,660 | 2/1937 | Saunders | 106/14 |
| 2,148,862 | 2/1939 | Kern | 106/14 |
| 2,237,745 | 4/1941 | Musgrave | 106/14 |
| 2,416,734 | 3/1947 | Boggs et al. | 106/14 |
| 2,585,609 | 2/1952 | Wills | 106/14 |
| 3,405,102 | 10/1968 | Kugler et al. | 260/37 EP |
| 3,707,583 | 12/1972 | McKown | 428/416 |
| 3,806,483 | 4/1974 | Juba et al. | 260/37 EP |

Primary Examiner—Lewis T. Jacobs

[57] ABSTRACT

A resinous adhesive composition which is resistant to the deleterious effect of moisture and water includes an additive selected from among inorganic nitrites, alkalinized salts of hexavalent chromium, inorganic phosphates, silicates, carbonates and mixtures thereof. The additive is present in an amount ranging from 0.1 to 10 percent, by weight, based on the weight of the adhesive.

7 Claims, No Drawings

SYNTHETIC ADHESIVE

This is a continuation of application Ser. No. 742,010, filed Nov. 15, 1976, now abandoned.

This invention relates to a resinous adhesive composition. More particularly the present invention relates to an epoxy resin adhesive composition which is resistant to the deleterious effects of water and moisture.

Among the more popular adhesives employed in commercial and industrial applications are those commonly referred to as "epoxy adhesives". These compositions typically comprise two basic components to which are added various modifying ingredients for the purpose of enhancing elasticity and modifying both the physical and mechanical properties thereof. These modifying ingredients usually include extenders, filling agents, diluents, curing accelerators and the like.

Detailed studies by those skilled in the art have revealed that the presence of water or moisture adversely affects adhesives by causing changes in the mechanical properties thereof. Upon curing the adhesive, zones of inner tension are formed which cause a disturbance and weakening of molecular bonds. This, in turn, causes the formation of cracks through which moisture penetrates the adhesive layer.

Analysis of cemented joints suggests that after prolonged periods of time, either point or surface corrosion appears on the cemented joint and penetrates through the adhesive to the adhesive-adherent boundary layer, so reducing the strength of the joint. This corrosion of the joint is further enhanced or accelerated by mechanically stressing the joint, as for example, by impact. In order to mitigate the effect of moisture and water on such joints, it has been common practice to modify the adhesive by employing therein materials which influence moisture penetration with respect to components of the adhesive as well as adherent surfaces.

Typical of such materials are the amine hardening agents and those of the type referred to as the polyaminoamide bases. Comparisons between these two classes of additives indicates that the amine hardening agents, particularly in powder form, evidence a smaller reduction in strength under the influence of moisture than the polyaminoamides. However, the amines fail to meet commercial requirements in most cases and interest has focused upon the polyaminoamides. These agents are characterized by satisfactory hardness and brittleness, a high modulus of elasticity and are compatible with processing conditions encountered in the adhesion process. However, their prime limitation inheres in the degree of strength reduction under the influence of moisture which causes irreversible damage to cemented joints. Thus, their efficacy for many industrial applications is severely impaired.

Another component of the adhesive having a significant bearing upon joint strength is the filler. Filling agents enhance the compression strength of the adhesive, tend to reduce the percentage of shrinkage upon curing and influence the properties of the loading joint. However, it has also been observed that filling agents accelerate the influence of moisture upon the adhesive. Accordingly, various factors must be taken into consideration when selecting a filler. These factors include density, bulk weight, surface wettability, size and shape of the particles, chemical composition and, of prime significance, the physical and chemical resistance to media to which cemented joints are exposed especially water and moisture.

Unfortunately, prior art efforts directed toward elimination of the foregoing difficulties have not been successful and it is to that end that the invention is directed.

In accordance with the present invention, the prior art limitations are effectively obviated by adding to the synthetic adhesives of interest from 0.1 to 10 percent, by weight, of water-soluble materials which are capable of reducing the influence of moisture or water on the adhesive. More specifically, these materials, which may be referred to as corrosion inhibitors of the passivation, coating and alkalinization type, upon addition to the adhesive diffuse through it and retard or destroy corrosion characteristics, thereby preserving the strength of the adhesive. Upon contact of the materials with water or moisture, the physical character of the latter changes in that osmotic pressure is modified, thereby retarding its rate of penetration into the adhesive and the boundary of the adhesive-adherent.

The additives employed herein may be selected from among the inorganic nitrites, alkalinized salts of hexavalent chromium, inorganic phosphates, silicates and carbonates and may be used alone or in combination. As noted above, the additives or modifiers are added in an amount ranging from 0.1 to 10 percent, by weight, based upon the total weight of the adhesive. At the lower percentages of addition, since it is not dissolved in the adhesive, it has been found advantageous to employ carriers for the additives to assure even distribution in the adhesive. Carriers selected for this purpose should evidence high absorption capacity. Typical carriers suitable for this purpose include carbon black, amorphous silica and the like. It is also important to avoid the use of an additive which might adversely react with the inorganic or organic filling agents such as titanium dioxide, insoluble silicates, metal powders and the like.

Although it will be understood that the present invention is directed to enhancing the characteristics of epoxy resins, it is not limited thereto and may be employed in conjunction with other resinous adhesive compositions. The epoxy resins suitable for use herein are selected from among the commercially available low molecular weight epoxy resins ranging in molecular weight from 350-4000 which are terminated by at least one epoxy (i.e., ethylene oxide) group. These epoxy resins are typically prepared by alkaline condensation of 2,2-bis-p-hydroxyphenylpropane(diane) with epichlorohydrin or dichlorohydrin.

Several examples of the present invention are set forth below. It will be appreciated by those skilled in the art that the exemplary embodiments are for purposes of exposition only and are not to be construed as limiting.

EXAMPLE 1

| Components of Adhesive | Parts, By Weight |
|---|---|
| Low Molecular Weight Epoxy Resin From Commercial Source, Molecular Weight 350-400 | 100 |
| Aluminum powder | 9 |
| Carbon black | 1.5 |
| Microasbestos powder | 3 |
| Sodium nitrite - $NaNO_2$ | 0.4 |
| Diethylene triamine | 8 |

EXAMPLE 2

| Components of Adhesive | Parts, By Weight |
| --- | --- |
| Low Molecular Weight Epoxy Resin (Modified), Molecular Weight 500 | 100 |
| Aluminum powder | 5 |
| Amorphous silica | 4 |
| Sodium carbonate $Na_2CO_3 \cdot 10\ H_2O$ | 0.5 |
| Sodium chromate $Na_2CrO_4 \cdot 4\ H_2O$ | 6.2 |
| Polyaminoamide (amine number 180-250) | 42 |

EXAMPLE 3

| Components of Adhesive | Parts, by Weight |
| --- | --- |
| Low Molecular Weight Epoxy Resin (Modified), Molecular Weight 500 | 100 |
| Carbon black | 0.5 |
| Amorphous silica | 11 |
| Sodium metaphosphate | 0.5 |
| Aliphatic polyamine (amine number 800-1100) | 73 |

EXAMPLE 4

| Components of Adhesive | Parts, By Weight |
| --- | --- |
| Low Molecular Weight Epoxy Resin (Modified), Molecular Weight 500 | 100 |
| Aluminum powder | 16 |
| Sodium carbonate - $Na_2CO_3$ | 6 |
| Polyaminoamide (amine number 180-250) | 40 |

EXAMPLE 5

| Components of Adhesive | Parts, By Weight |
| --- | --- |
| Epoxy Resin, Molecular Weight 2000 | 100 |
| Amorphous Silica | 3 |

-continued

| Components of Adhesive | Parts, By Weight |
| --- | --- |
| Sodium silicate ($Na_2SiO_3$) | 0.7 |
| Aluminum powder | 3 |
| Acetone | 22 |
| Diethylene triamine | 11 |

Studies of shear strength of commercial epoxy adhesives without additives was found to range from 160-200 kp per square centimeter. These values were found to be comparable with shear strength of the adhesives of the invention. However, when exposing the synthetic adhesives of the invention to water or a medium of high moisture content under ambient and elevated temperature, the basic shear strength remained unchanged whereas the adhesives of the prior art under these conditions evidenced a reduction of strength within the range of 20-40 percent of shear strength.

What is claimed is:

1. Synthetic adhesive characterized in that it comprises from 0.1 to 10 percent, by weight, based on the weight of the adhesive, of a water-soluble agent which is insoluble in the adhesive and comprises corrosion inhibitors of the passivation, coating, and alkalinization type, said agent being selected from the group consisting of alkali metal nitrates, alkalinized salts of hexavalent chromium, alkali metal phosphates, alkali metal carbonates, alkali metal silicates and mixtures thereof.

2. Synthetic adhesive in accordance with claim 1, wherein said agent is deposited on a carrier.

3. Synthetic adhesive in accordance with claim 1, wherein said agent is sodium silicate.

4. Synthetic adhesive in accordance with claim 1, wherein said agent is sodium nitrite.

5. Synthetic adhesive in accordance with claim 1, wherein said agent is sodium metaphosphate.

6. Synthetic adhesive in accordance with claim 1, wherein said agent is sodium carbonate.

7. Synthetic adhesive in accordance with claim 1, wherein said agent is a mixture of sodium carbonate and sodium chromate.

* * * * *